(12) United States Patent
Fan

(10) Patent No.: US 8,000,681 B2
(45) Date of Patent: Aug. 16, 2011

(54) SYSTEM AND METHOD FOR MANAGING COMMUNICATION RECORDS

(75) Inventor: Cheng-Kang Fan, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 298 days.

(21) Appl. No.: 12/488,470

(22) Filed: Jun. 19, 2009

(65) Prior Publication Data

US 2010/0056107 A1   Mar. 4, 2010

(30) Foreign Application Priority Data

Aug. 28, 2008   (CN) .......................... 2008 1 0304271

(51) Int. Cl.
*H04M 3/16*   (2006.01)

(52) U.S. Cl. ........... 455/411; 455/410; 455/419; 726/24
(58) Field of Classification Search .................. None
See application file for complete search history.

(56) References Cited

U.S. PATENT DOCUMENTS

2004/0005876 A1*  1/2004  Tuoriniemi ................ 455/411
2005/0255829 A1* 11/2005  Kirkup et al. ............. 455/410

* cited by examiner

*Primary Examiner* — Phuoc Doan
(74) *Attorney, Agent, or Firm* — Altis Law Group, Inc.

(57) ABSTRACT

A system and method for managing communication records of a communication device include setting a phone number of an authorized user, transmission options, and a transmission period, and generating communication records according to recorded communication information of the communication device. The system and method further include transmitting the communication records to the authorized user according to the transmission options and the transmission period.

20 Claims, 4 Drawing Sheets

| No. | Type | Phone Number | Talk time | …… | Deleted |
|---|---|---|---|---|---|
| 1 | Dialed | 1-111-111-1111 | 30 minutes | | V |
| 2 | Received | 1-222-222-2222 | 2 hour | | ☐ |
| 3 | Missed | 1-333-333-3333 | 20 seconds | | V |
| … | … | … | … | … | ☐ |

FIG. 3

SYSTEM AND METHOD FOR MANAGING COMMUNICATION RECORDS

BACKGROUND

1. Technical Field

Embodiments of the present disclosure relate to systems and methods for information management, and more particularly to a system and method for managing communication records of a communication device.

2. Description of Related Art

Generally, a cell phone communication service provider may provide communication records for users to review. However, it may not be convenient to acquire the communication records from the cell phone communication service provider. For example, the users may need to go to business locations of the cell phone communication service provider, show their identification cards, and fill some forms, etc.

In other aspect, younger children may not understand or be aware of mobile phone charges, and thus may use their mobile phones indiscriminately, which may result in expensive phone charges. In another aspect, when a company provides mobile phones to employees for client use, it is important to know how the mobile phones are being used, for the purpose of reducing communication costs of the company.

What is needed, therefore, is an improved system and method for managing communication records of a communication device.

BRIEF DESCRIPTION OF THE DRAWINGS

FIG. 3 is a schematic diagram of one embodiment of a communication record list.

DETAILED DESCRIPTION

All of the processes described may be embodied in, and fully automated via, functional code modules executed by one or more general purpose computers or processors. The code modules may be stored in any type of computer-readable medium or other storage device. Some or all of the methods may alternatively be embodied in specialized computer hardware or electronic apparatus.

Figure 1:
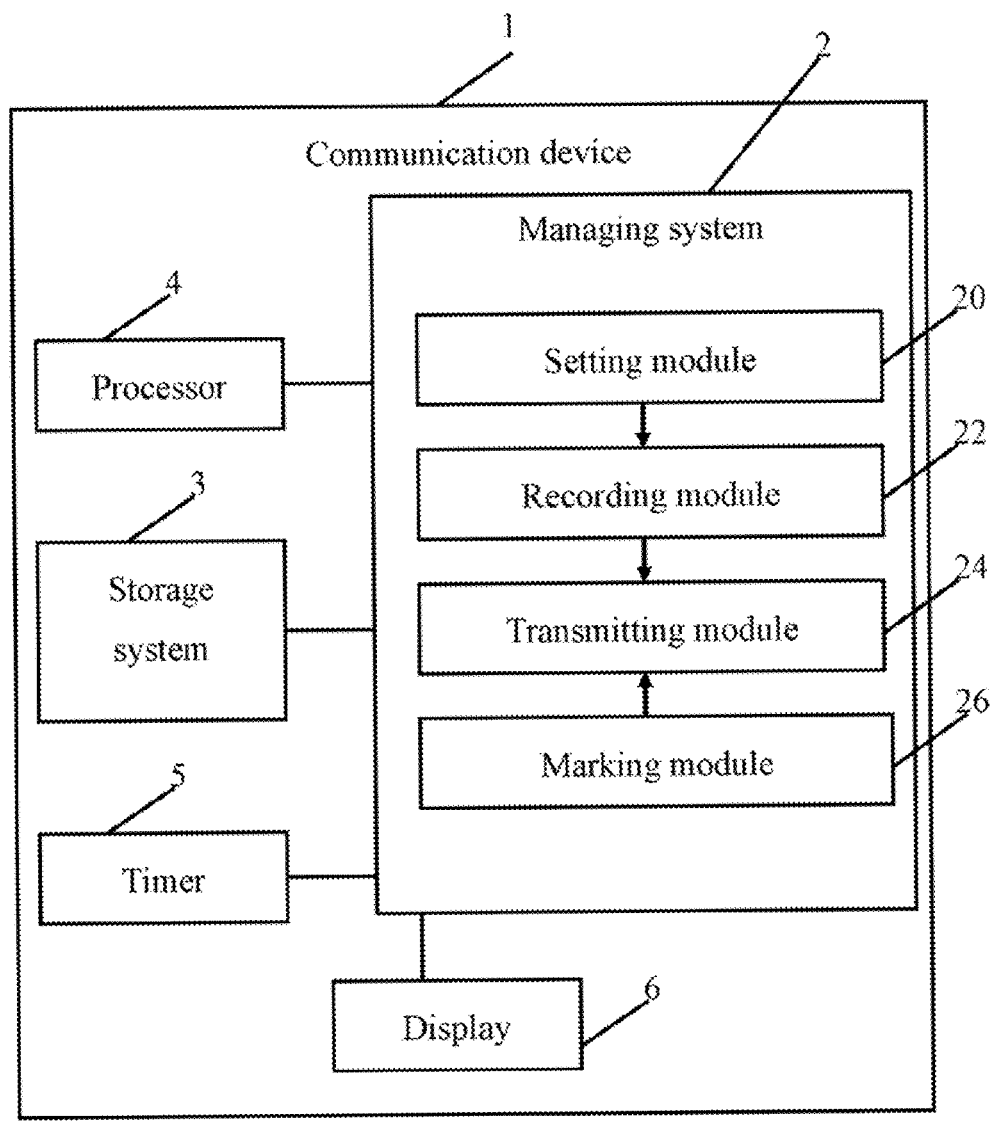
FIG. 1 is a block diagram of one embodiment of a system for managing communication records of a communication device.

FIG. 1 is a block diagram of one embodiment of a system 2 for managing communication records of a communication device 1 (hereinafter referred to as "the managing system 2"). In one embodiment, the managing system 2 is included in a computer readable medium of the communication device 1. In another embodiment, the managing system 2 may be included in an operating system of the communication device 1.

The communication device 1 may include a storage system 3, a processor 4, a timer 5, and a display 6. The storage system 3 stores one or more programs, such as programs of the operating system, and other applications of the communication device 1. The storage system 3 further stores various kinds of data, such as a contact list, messages, E-mails, images, communication records, etc. In one embodiment, the communication device 1 may be a mobile phone, and the storage system 3 may be a memory of the communication device 1 or an external storage card, such as a memory stick, a Subscriber Identification Module (SIM) card, a smart media card, a compact flash card, or any other type of memory card. The processor 4 executes programs of the communication device 1 and the other applications, to provide functions of the communication device 1. The timer 5 is operable to time a preset period.

Figure 2:
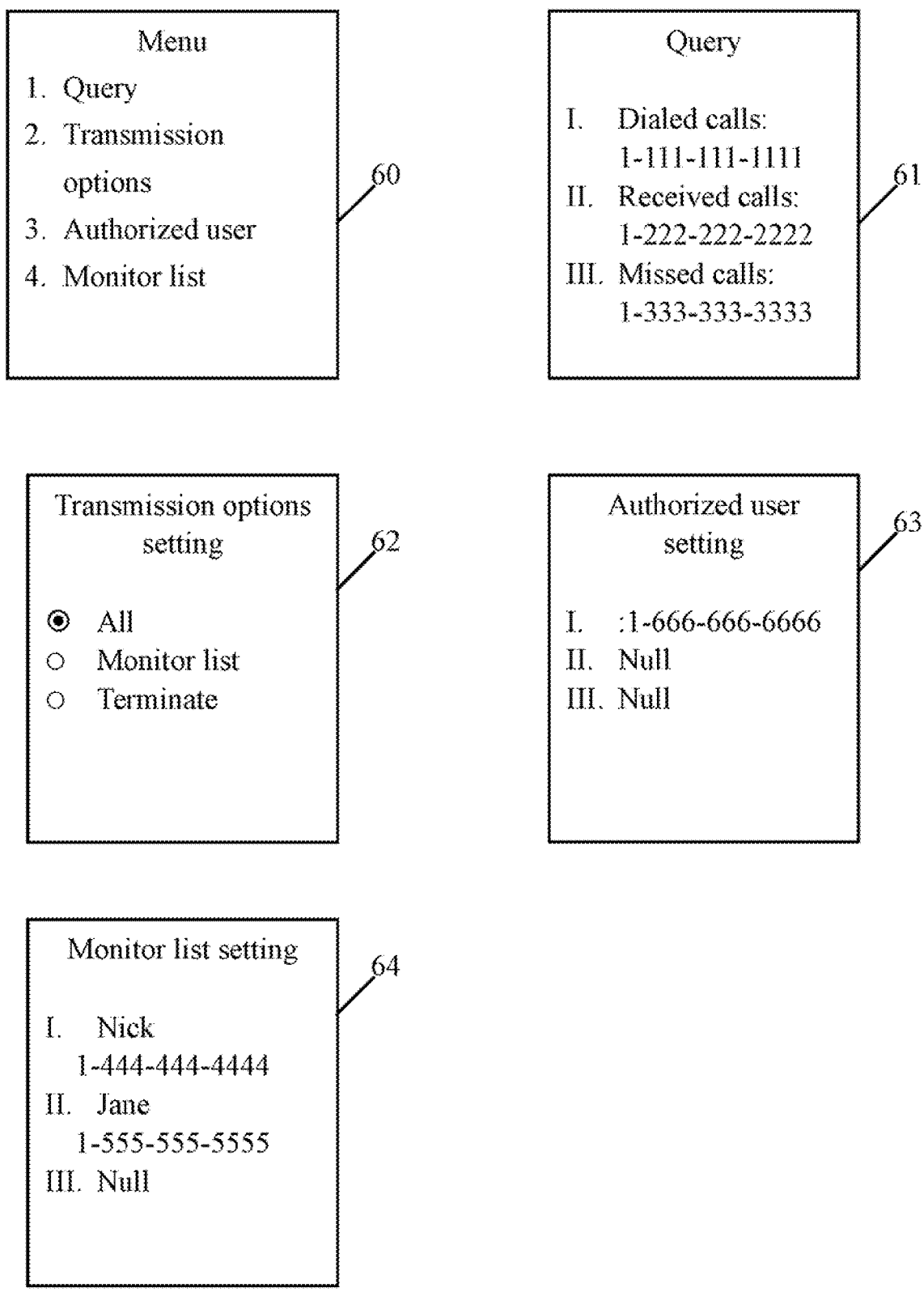
FIG. 2 is a schematic diagram of one embodiment of user interfaces of the communication device of FIG. 1.

In one embodiment, the managing system 2 provides various user interfaces to the display 6 to perform different operations. Referring to FIG. 2, the various user interfaces may include a menu interface 60, a query interface 61, a transmission options setting interface 62, an authorized user setting interface 63, and a monitor list setting interface 64. The user interfaces may further include other kinds of user interfaces not shown in FIG. 2, such as an information modification interface, etc.

The managing system 2 includes a setting module 20, a recording module 22, a transmitting module 24, and a marking module 26. The modules 20, 22, 24, and 26 may be executed by the processor 4 to perform one or more operations of the communication device 1, to manage the communication records in the storage system 3.

The setting module 20 sets a startup instruction and an access password to invoke the managing system 2, and sets an option of the managing system 2 to run as a background process. In one embodiment, the managing system 2 cannot be invoked unless the startup instruction is input. The startup instruction may be a character string including alphanumeric characters and/or symbols, such as "#callhistory#." When the managing system 2 is invoked, the user is required to input a password. If the input password matches the access password, the managing system 2 begins to run.

The setting module 20 sets a phone number of an authorized user who needs to receive and view communication records of the communication device 1, sets transmission options to transmit the communication records to the authorized user, and creates a monitor list by tagging one or more contacts in a contact list of the communication device 1. As the transmission options setting interface 62 shown in FIG. 2, the transmission options may include, but are not limited to, transmitting all communication records, transmitting communication records merely related with the one or more contacts in the monitor list, and terminating transmission.

The setting module 20 also sets a transmission period to transmit the communication records to the authorized user periodically. The transmission period may be a period (e.g., "one hour") or zero. If the transmission period is set as a time period, the timer 5 is activated to time the transmission period once the managing system 2 is invoked, and the communication records generated within the time period are transmitted to the authorized user in every time period. If the transmission period is set as zero, the communication records are transmitted to the authorized user immediately once the communication records are generated.

The recording module 22 records communication information of the communication device 1, generates communication records according to the communication information, and stores the generated communication records into the storage system 3. The communication information may include, but are not limited to phone numbers, talk time of a phone conversation, start time and end time of a phone conversation, etc. Referring to FIG. 3, a communication record list including a plurality of communication records is shown. The communication record list includes various communication information, such as types, phone numbers, talk time, etc. Volumes and contents of the communication record list may be modified, added, or deleted by the authorized user.

The transmitting module 24 selects the communication records generated within the transmission period from the storage system 3, and transmits the selected communication records to the authorized user according to the transmission options. Before selecting the communication records, the transmitting module 24 determines if the transmission period is equal to zero, to determine whether the communication records are transmitted immediately or periodically. If the transmission period is equal to zero, the communication records are determined to be transmitted immediately once the communication records are generated. Otherwise, if the transmission period is not equal to zero, the communication records are determined to be transmitted periodically.

In one embodiment, the transmission period is set as 2 hours. Once the managing system 2 is invoked, the timer 5 is activated and the transmitting module 24 selects the communication records generated within the transmission period (i.e., 2 hours) from the storage system 3 when the time reaches the transmission period. Then the timer 5 is reset and begins to time a next transmission period.

The marking module 26 determines if a generated communication record has been selected to be deleted from the storage system 3 via selecting a "delete" function/option. If a generated communication record has been selected to be deleted from the storage system 3, the marking module 26 marks the generated communication record that has been selected to be deleted and hiding the marked generated communication record from view, and the transmitting module 24 transmits the marked generated communication record with other communication records generated within the transmission period to the authorized user.

Figure 4:
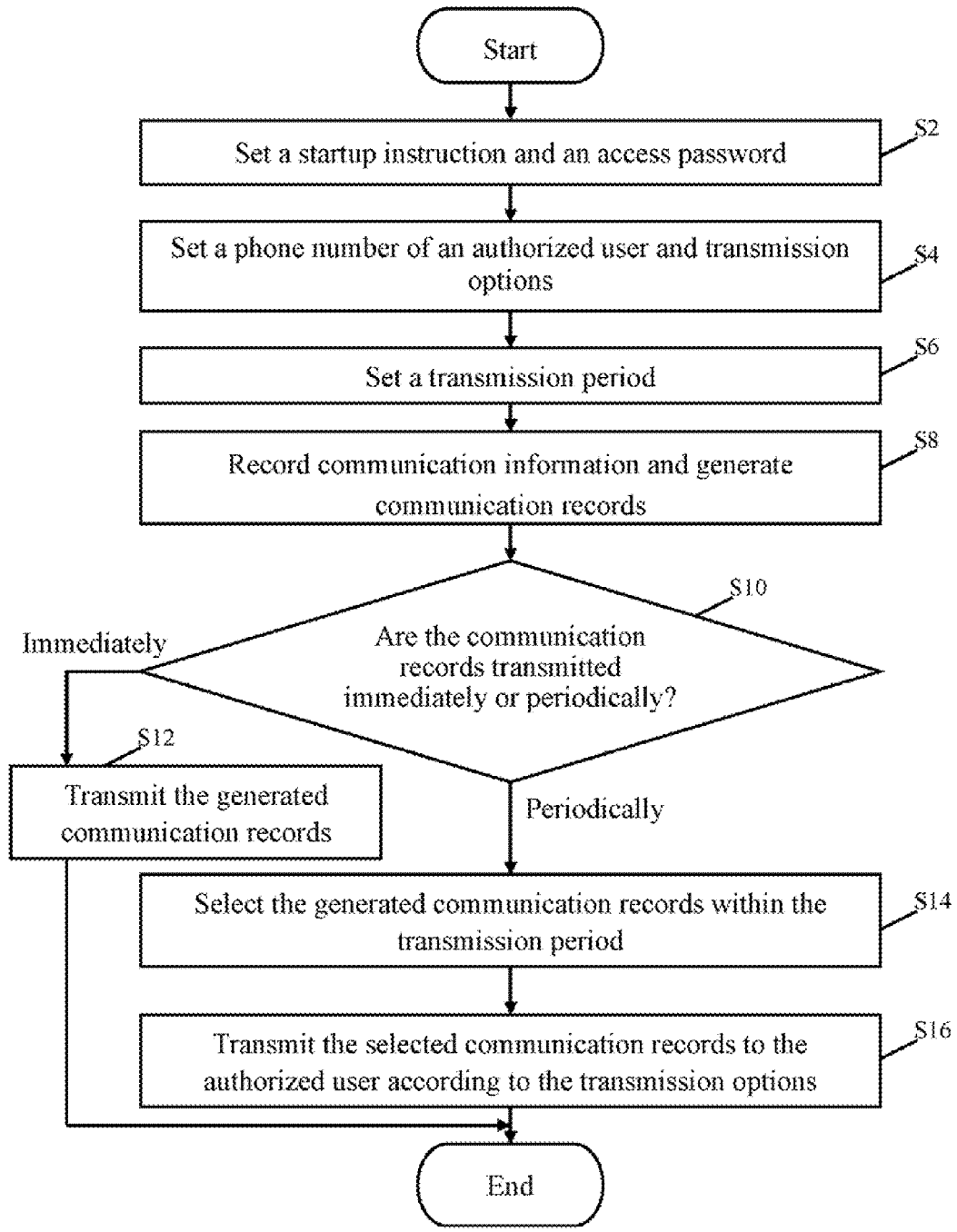
FIG. 4 is a flowchart of one embodiment of a method for managing communication records of the communication device of FIG. 1.

FIG. 4 is a flowchart of one embodiment of a method for managing communication records of the communication device 1 of FIG. 1. Depending on the embodiment, additional blocks may be added, others removed, and the ordering of the blocks may be replaced.

In block S2, the setting module 20 sets a startup instruction and an access password to invoke the managing system 2, and sets an option of the managing system 2 to run as a background process.

In block S4, the setting module 20 sets a phone number of an authorized user who needs to receive and view communication records of the communication device 1, sets transmission options to transmit the communication records to the authorized user, and creates a monitor list by tagging one or more contacts in a contact list of the communication device 1. As the transmission options setting interface 62 shown in FIG. 2, the transmission options may include, but are not limited to, transmitting all communication records, transmitting communication records merely related with the one or more contacts in the monitor list, and terminating transmission.

In block S6, the setting module 20 sets a transmission period to transmit the communication records in the storage system 3 to the authorized user periodically. In one embodiment, the transmission period may be a time period (e.g., "one hour") or zero. If the transmission period is set as a time period, the communication records generated within the time period are transmitted to the authorized user in every time period. If the transmission period is set as zero, the communication records are transmitted to the authorized user immediately once the communication records are generated.

In block S8, when the managing system 2 is invoked by inputting the startup instruction, the recording module 22 records communication information of the communication device 1, generates communication records according to the communication information, and stores the generated communication records into the storage system 3. The communication information may include, but are not limited to, phone numbers, talk time of a phone conversation, start time and end time of a phone conversation, etc.

In block S10, the transmitting module 24 determines whether the communication records are transmitted immediately or periodically by determining if the transmission period is equal to zero.

If the communication records are determined to be transmitted immediately, in block S12, the transmitting module 24 transmits the generated communication records to the authorized user according to the transmission options immediately.

If the communication records are determined to be transmitted periodically, in block S14, the transmitting module 24 selects the communication records generated within the transmission period from the storage system 3.

In block S16, the transmitting module 24 transmits the selected communication records to the authorized user according to the transmission options.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for managing communication records of a communication device, the method comprising:
    setting a phone number of an authorized user of the communication device, transmission options to transmit the communication records in a storage system of the communication device to the authorized user, and a transmission period;
    recording communication information of the communication device;
    generating communication records according to the communication information, and storing the communication records into the storage system;
    determining whether the communication records are transmitted immediately or periodically according to the transmission period;
    selecting the communication records generated within the transmission period from the storage system if the communication records are determined to be transmitted periodically; and
    transmitting the selected communication records to the authorized user according to the transmission options.

2. The method according to claim 1, further comprising:
    creating a monitor list by tagging one or more contacts in a contact list of the communication device.

3. The method according to claim 2, wherein the transmission options comprise transmitting all of the generated communication records, transmitting communication records related with the one or more contacts in the monitor list, and terminating transmission.

4. The method according to claim 1, wherein the determining step comprises:
    in response to the transmission period being equal to zero, immediately transmitting the communication records to the authorized user once the communication records are generated; or
    in response to the transmission period being not equal to zero, periodically transmitting the communication records to the authorized user.

5. The method according to claim 1, further comprising:
determining if a generated communication record has been selected to be deleted from the storage system;
marking the generated communication record that has been selected to be deleted and hiding the marked generated communication record from view; and
transmitting the marked generated communication record to the authorized user.

6. The method according to claim 1, further comprising:
setting a startup instruction and an access password to allow managing access of the communication records of the communication device.

7. The method according to claim 1, wherein the selecting step comprises:
activating a timer of the communication device;
selecting the generated communication records within the transmission period from the storage system when the time reaches the transmission period; and
resetting the timer.

8. A computing system for managing communication records of a communication device, the computing system comprising:
a storage system to store communication records;
at least one processor; and
one or more programs stored in the storage system and being executable by the at least one processor, the one or more programs comprising:
a setting module operable to set a phone number of an authorized user of the communication device, transmission options to transmit the communication records in the storage system to the authorized user, and a transmission period;
a recording module operable to record communication information of the communication device, generate communication records according to the communication information, and store the communication records into the storage system;
a transmitting module operable to determine whether the communication records are transmitted immediately or periodically, select the communication records generated within the transmission period from the storage system if the communication records are determined to be transmitted periodically, and transmit the selected communication records to the authorized user according to the transmission options.

9. The computing system according to claim 8, wherein the setting module is further operable to create a monitor list by tagging one or more contacts in a contact list of the communication device.

10. The computing system according to claim 9, wherein the transmission options comprise transmitting all of the generated communication records, transmitting communication records related with the one or more contacts in the monitor list, and terminating transmission.

11. The computing system according to claim 8, wherein the transmitting module immediately transmits the communication records to the authorized user once the communication records are generated in response to the transmission period being equal to zero, or periodically transmits the communication records to the authorized user in response to the transmission period being not equal to zero.

12. The computing system according to claim 8, wherein the one or more programs further comprises a marking module operable to determine if a generated communication record has been selected to be deleted from the storage system, and mark the generated communication record that has been selected to be deleted and hiding the marked generated communication record from view.

13. The computing system according to claim 8, wherein the setting module is further operable to set a startup instruction and an access password to allow managing access of the communication records of the communication device.

14. A storage medium storing a set of instructions, the set of instructions capable of being executed by a processor to perform a method for managing communication records of a communication device comprising the processor, the method comprising:
setting a phone number of an authorized user of the communication device, transmission options to transmit the communication records in a storage system of the communication device to the authorized user, and a transmission period;
recording communication information of the communication device;
generating communication records according to the communication information, and storing the communication records into the storage system;
determining whether the communication records are transmitted immediately or periodically according to the transmission period;
selecting the communication records generated within the transmission period from the storage system if the communication records are determined to be transmitted periodically; and
transmitting the selected communication records to the authorized user according to the transmission options.

15. The storage medium as claimed in claim 14, wherein the method further comprises:
creating a monitor list by tagging one or more contacts in a contact list of the communication device.

16. The storage medium as claimed in claim 15, wherein the transmission options comprise transmitting all of the generated communication records, transmitting communication records related with the one or more contacts in the monitor list, and terminating transmission.

17. The storage medium as claimed in claim 14, wherein the determining step comprises:
in response to the transmission period being equal to zero, immediately transmitting the communication records to the authorized user once the communication records are generated; or
in response to the transmission period being not equal to zero, periodically transmitting the communication records to the authorized user.

18. The storage medium as claimed in claim 14, wherein the method further comprises:
determining if a generated communication record has been selected to be deleted from the storage system;
marking the generated communication record that has been selected to be deleted and hiding the marked generated communication record from view; and
transmitting the marked generated communication record to the authorized user.

19. The storage medium as claimed in claim 14, wherein the method further comprises:
setting a startup instruction and an access password to allow managing access of the communication records of the communication device.

20. The storage medium as claimed in claim 14, wherein the selecting step comprises:
activating a timer of the communication device;
selecting the generated communication records within the transmission period from the storage system when the time reaches the transmission period; and
resetting the timer.

* * * * *